United States Patent

Naito et al.

[11] Patent Number: 5,867,477
[45] Date of Patent: Feb. 2, 1999

[54] OPTICAL DISK WITH SNAP-FIT MAGNETIZED HUB

[75] Inventors: Takashi Naito; Shizuo Arai, both of Kanagawa, Japan

[73] Assignee: Sony Corporation, Tokyo, Japan

[21] Appl. No.: 53,193

[22] Filed: Apr. 28, 1993

[30] Foreign Application Priority Data

Apr. 28, 1992 [JP] Japan ................................. 4-108267

[51] Int. Cl.⁶ .................................................. G11B 23/00
[52] U.S. Cl. .......................................................... 369/290
[58] Field of Search ................................. 369/270, 289, 369/290; 360/99.01, 99.05, 99.07, 99.08, 133, 135

[56] References Cited

U.S. PATENT DOCUMENTS

| 4,802,158 | 1/1989 | Ogusu | 369/290 |
| 4,829,510 | 5/1989 | Takahashi | 369/290 |
| 4,944,982 | 7/1990 | Kikuchi | 369/290 |
| 4,982,399 | 1/1991 | Odawara et al. | 369/290 |
| 5,050,158 | 9/1991 | Kitada et al. | 369/290 |
| 5,204,853 | 4/1993 | Kamoshita | 369/290 |
| 5,243,481 | 9/1993 | Dunckley et al. | 360/99.08 |

FOREIGN PATENT DOCUMENTS 1107388   4/1989   Japan ..................................... 369/290

*Primary Examiner*—David L. Ometz
*Attorney, Agent, or Firm*—Hill & Simpson

[57] ABSTRACT

An optical disk is equipped with a hub which is very easy to attach and detach. The hub has a bottom and a cylindrical wall which projects upwards from the bottom, and which is inserted in the center hole of the optical disk. The cylindrical wall of the hub is slotted so that the upper end of the cylindrical wall can be bent radially inwards to a smaller diameter allowing removal of the hub from the optical disk. The hub further has stoppers, formed at or near the bottom, for abutting the lower surface of the optical disk, and claws formed at or near the upper end of the cylindrical wall, for abutting on the upper surface of the optical disk.

3 Claims, 5 Drawing Sheets

OPTICAL DISK WITH SNAP-FIT MAGNETIZED HUB

BACKGROUND OF THE INVENTION

The present invention relates to an optical disk information recording medium which makes it possible to use optical disks of a CD (compact disk) type in ISO standard optical disk equipment.

Disk-shaped information recording media of 5 inch size and 3.5 inch size, for example, are classified according to physical configurations and record/reproduce modes, into CD type optical disks as shown in FIG. 5, and ISO standard optical disks as shown in FIG. 6.

The CD type optical disks of various kinds are compatible among them so that each of them can run on a single common reproducing system. Similarly, the ISO standard optical disks are compatible so that a single reproducing system suffices to replay all the ISO standard disks.

In general, an ISO standard optical disk system is provided with an optical pickup which can read not only the ISO type disk but also the CD type disk, so that the CD type disk can be replayed in the ISO equipment if the CD disk can be loaded in the ISO equipment, as disclosed in Japanese Patent Provisional Publication 3-185689. An optical disk recording medium shown in this Japanese document utilizes two detachable chucking elements attached to the center hole of an optical disk on both sides. It is, however, troublesome to attach and detach the two chucking elements.

SUMMARY OF THE INVENTION

It is therefore an object of the present invention to provide an optical disk (or disc) recording medium (or an optical disk system comprising at least an optical disk recording medium) which is very easy to handle.

According to the present invention, an optical disk type recording medium which is adapted to be placed on a turn table rotatable as a unit with a spindle of an optical disk appratus to reproduce information on a disk surface with an optical beam, comprises an optical disk comprising a center hole and a center core. The center core is fit in the center hole of the optical disk, and the center core comprise a bottom, a cylindrical wall, at least one stopper, at least one claw, and two or more slits. The cylindrical wall extends axially from the bottom and comprises at least one wall portion in which the claw is formed. The stopper is a projection projecting outwards from an outside peripheral surface of the cylindrical wall and abutting on a lower surface of the optical disk. The claw is also a projection which is formed in the wall portion, which projects from the outside peripheral surface of the cylindrical wall and which abuts on an upper surface of the optical disk so as to hold the optical disk axially between the stopper and the claw. The slits are formed in the cylindrical wall so as to define the first wall portion and to make the first wall portion elastic so that the wall portion can be elastically displaced radially inwards to a deformed position to allow the center core to be removed from the optical disk by passing the cylindrical wall and the claw through the center hole of the optical disk.

The recording medium according to the present invention may further comprises a cartridge enclosing the optical disk.

An optical disk system according to the present invention may consists only of the thus-constructed recording medium, or may further comprises at least one optical disk player.

It is very easy to attach and remove the center core or center hub according to the present invention, to and from an optical disk.

DETAILED DESCRIPTION OF THE INVENTION

FIGS. 1A–4 show one embodiment of the present invention.

Figure 1A:
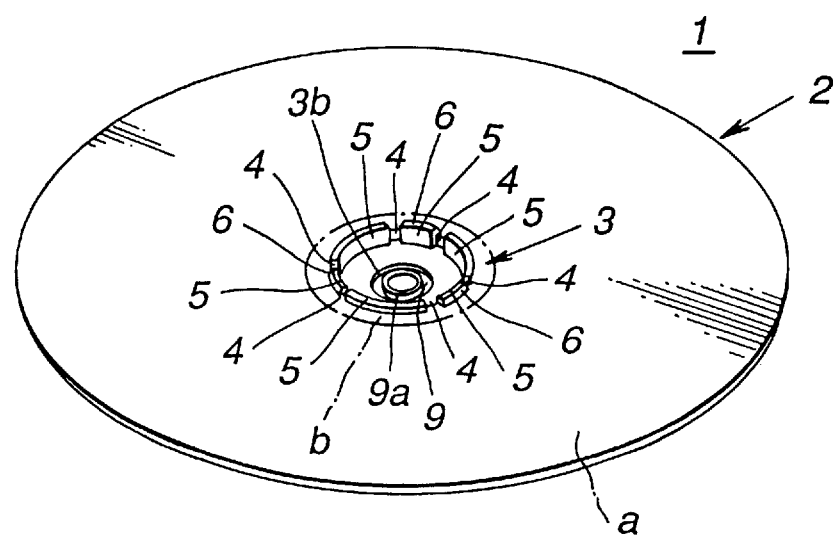
FIGS. 1A and 1B are perspective view and sectional view showing an optical disk information recording medium according to one embodiment of the present invention.
Figure 1B:
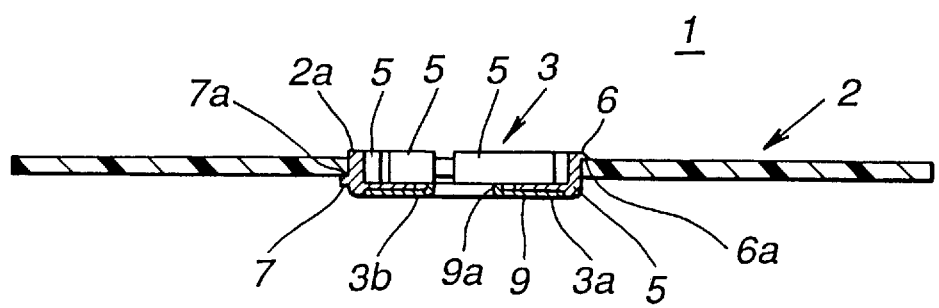
Figure 2:
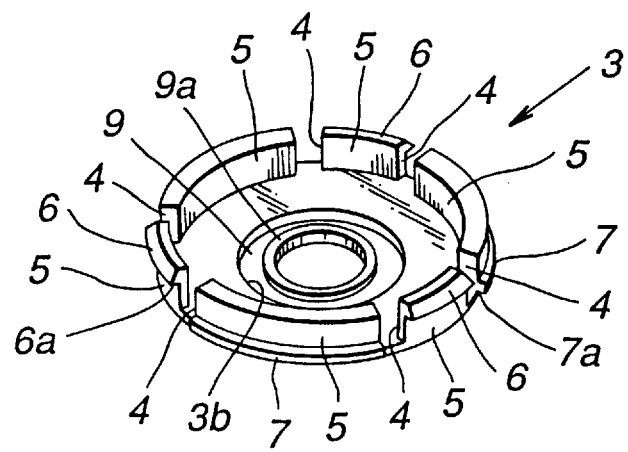
FIGS. 2A, 2B and 2C are perspective view, plan view and front view showing a hub of the recording medium according to the embodiment of the invention.
Figure 2:
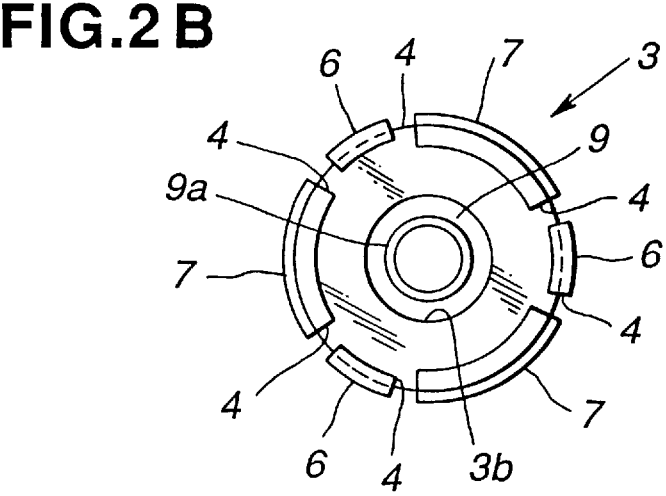
Figure 2:
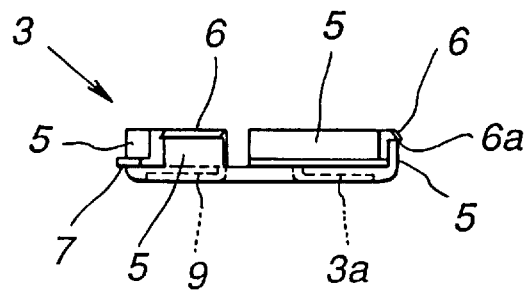

FIGS. 1A and 1B show a CD type optical disk 1 such as a CD-ROM. This optical disk 1 is a unit consisting of a plain optical disk 2, and a hub or center core 3. The optical disk 2 is formed with a circular center through hole 2a extending from a first (upper) open end opening in the first (upper) surface of the disk 2, to a second (lower) open end opening in the second (lower) surface. The hub 3 is attached in the center hole 2a of the disk 2 in such a detachable manner that the hub 3 can be readily detached from the disk 2.

The optical disk 2 has a recording area "a" for recording code information, for example, and a central non-recording area (or clamping area) "b" around the central hole 2a.

The hub or center core 3 is approximately in the form of a short hollow cylinder having a bottom. The hub 3 has a cylindrical wall, and a bottom 3a which closes the lower end of the cylindrical wall. The upper end of the cylindrical wall is open. The cylindrical wall has outside and inside peripheral surfaces which are both cylindrical surfaces. The bottom 3a is flat and circular, and extends radially inwardly from the lower end of the cylindrical wall. The bottom 3a is formed with a circular center hole 3b.

The cylindrical wall of the hub 3 is divided into a plurality of separate walls. In this example, the cylindrical wall of the hub 3 has six slits 4, three first separate arched walls 5 each having a claw 6, and three second arched walls 5 each having a stopper 7. The first and second separate walls 5 are arranged alternately in a circle around the center hole 3b. Each slit 4 extends from the upper end of the cylindrical wall to the bottom 3a along the axial direction of the hub 3. Each separate wall 5 is separated from the two neighboring separate walls on both sides by two of the slits 4. In this example, the first separate walls having the claws 6 are shorter in circumferential dimension than the second separate walls, as best shown in FIG. 2A.

The claws 6 and the stopper 7 are outward projections projecting radially outwardly from the outside cylindrical surface of the cylindrical wall. The claws 6 are formed at a height (or axial position) closer to the upper end of the cylindrical wall. The stopper 7 are formed at a height closer to the lower end of the cylindrical wall. The claws 6 have outside conical surfaces which are approximately parts of a conical surface, so that a radial distance of the conical surface from the axis of the hub 3 becomes smaller toward the upper end of the hub 3. Each claw 6 further has a lower surface 6a facing axially downwards toward the lower end of the wall. Each stopper 7 has an upper stopper surface 7a facing axially upwards toward the upper end of the wall.

Figure 4:
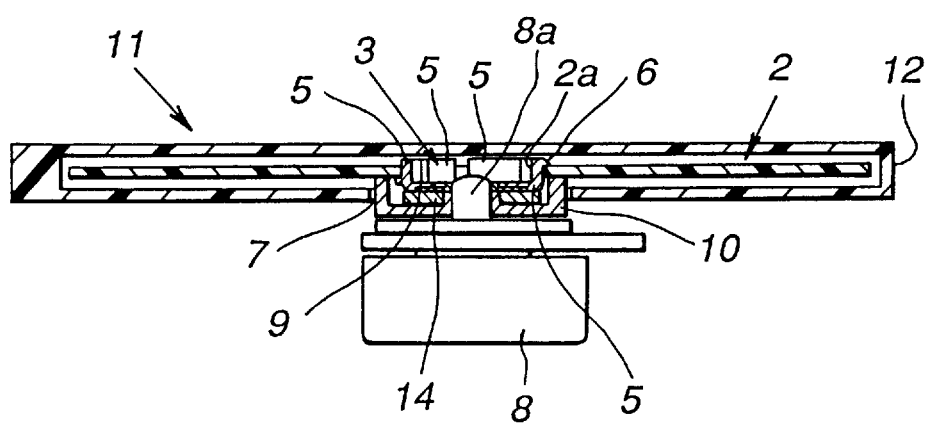
FIG. 4 is a sectional view showing the optical disk recording medium loaded in the ISO standard reproducing system.
Figure 5:
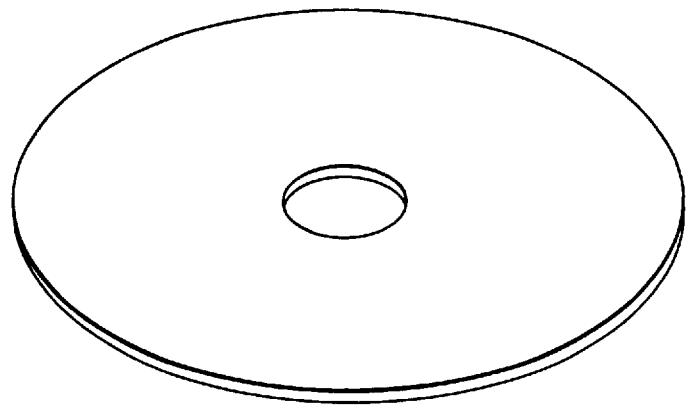
FIG. 5 is a perspective view showing a CD type plain optical disk.
Figure 6:
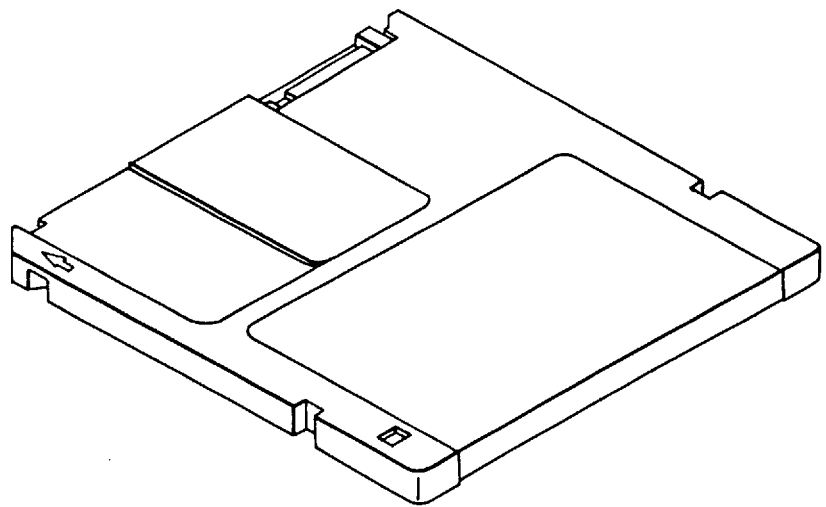
FIG. 6 is a perspective view showing an ISO standard photomagnetic disk.

The hub 3 further has a circular recess which is formed in the lower surface of the bottom 3a. A circular chucking member 9 is installed in this circular recess. The chucking member 9 is made of magnetic material such as iron. The chucking member 9 is in the form of a circular disk, and has a cylindrical center projection 9a projecting axially upwards. The projection 9a has a circular center hole for receiving an output shaft 8a of a spindle motor 8 as shown in FIG. 4. The annular projection 9a projects coaxially in the central hole 3b of the hub 3, as shown in FIGS. 2A and 2B.

Each of the stoppers 7 has an outside cylindrical surface. The outside cylindrical surfaces of the stoppers 7 are portions of an imaginary cylindrical surface coaxial with the hub 3, and they are used as a reference surface for radial positioning with respect to a disk table 10 of an ISO standard optical disk system or equipment.

Figure 3:
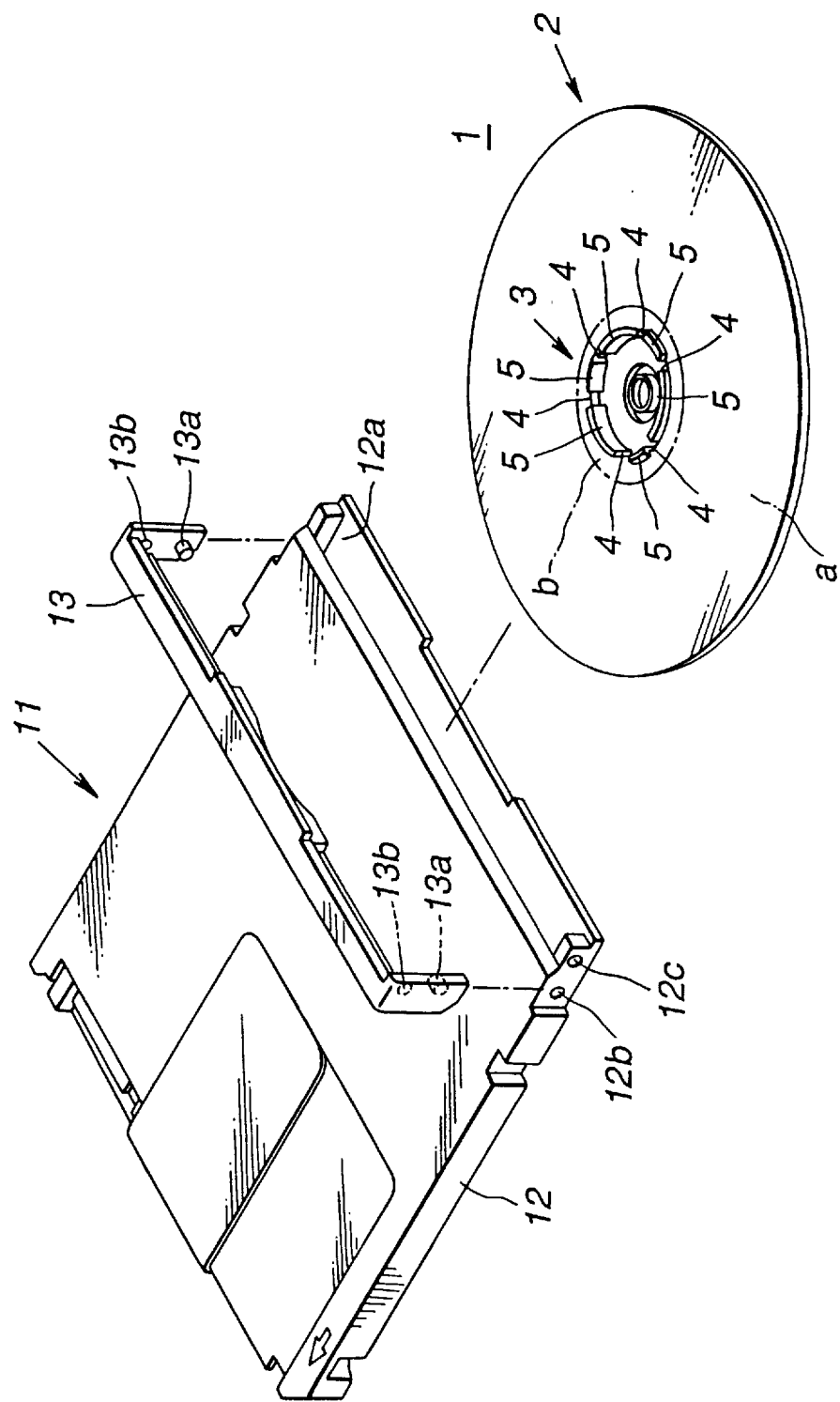
FIG. 3 is a perspective view showing an optical disk cartridge used for reproduction of a recording of the optical disk recording medium according to the embodiment of the invention in a ISO standard optical disk reproducing system.

FIG. 3 shows a CD type optical disk cartridge 11 according to the embodiment of the present invention. The cartridge 11 includes a case 12 and a lid 13. The case 12 is shaped approximately like a cuboid (rectangular parallelpiped), and has wide upper (first) and lower (second) surfaces, and front, rear, left and right sides which are all long and narrow. The rear side 12a of the case 12 is open so that the optical disk unit 1 shown in FIGS. 1A and 1B can be inserted into and extracted from the interior hollow space of the case 12 through the open rear end (mouth) 12a. The lid 13 is pivotally mounted on the rear portion of the case 12 for closing and opening the open rear end 12a. The lid 13 is approximately U-shaped, and has a long and narrow main portion for closing the open rear end 12a, and left and right short arms projecting in the same direction, respectively, from the left and right ends of the main lid portion. This cartridge 11 is adapted to be inserted into, and extracted from, the ISO standard optical disk system.

A small depression 12b and a small projection 12c are formed in each of the left and right sides of the case 12. A pivot shaft 13a and a depression 13b are formed in the inside surface of each of the left and right arms of the lid 13. On each side, the pivot shaft 13a is adapted to be received in the depression 12b of case 12 for allowing the lid 13 to swing. The depression 13b is designed to receive the projection 12c of the case 12 on each side.

The disk table 10 shown in FIG. 4 has a magnet 14 for holding the chucking member 9 by magnetic force. The magnet 14 is disposed in, and attached to, the disk table 10.

In the thus-constructed optical disk information recording medium, the hub 3 can be easily inserted into the center hole 2a of the optical disk 2 by elastically deforming the separate walls 5. The plain disk 2 can be equipped with the hub 3 without difficulty and without need of skill.

The CD type optical disk 1 according to this embodiment can be loaded into the ISO standard optical disk equipment in the following manner. The optical disk 1 is first encased in the cartridge 11 by opening the lid 13, inserting the disk 1 into the cartridge case 12 from the open rear end 12a, and closing the lid 13. Then, the optical disk 1 sheathed in the cartridge 11 is placed on the disk table 10 as shown in FIG. 4. In this way, the present invention makes it possible to use the optical disk 1 of the compact disk type in the ISO standard system.

What is claimed is:

1. An optical disk system comprising:

an optical disk with a circular center hole which extends from a first upper surface of said optical disk to a second lower surface of said optical disk;

a center core formed with a hollow cylindrical wall which extends axially from a first end to a second end and is receivable in said center hole of said optical disk, a circular bottom portion attached to said second end of said cylindrical wall, and a stopper projecting outwards from said cylindrical wall and abutting against said second lower surface of said optical disk so as to limit axial movement of said center core through said center hole of said optical disk in a first axial direction, said cylindrical wall formed with a plurality of slits extending from said first end of said cylindrical wall toward said circular bottom portion, and a plurality of first arched wall portions each of which is bounded circumferentially between two of said slits, each of which projects axially in said first axial direction from said circular bottom portion to said first end of said cylindrical wall and each of which is formed with a claw that projects radially outward, said each of claws engaging the first upper surface of said optical disk and being normally held in an unstressed normal position in which said claws prevent said center core from being extracted from said optical disk in a second axial direction which is opposite to said first axial direction by abutting against said first first upper surface of said optical disk, said first arched wall portions being elastic so that said claws can be elastically bent radially inwards from said normal position to a deformed position in which said center core can be extracted in said second axial direction from said optical disk, wherein said cylindrical wall of said center core further has a second plurality of arched wall portions each of which is bounded circumferentially between two of said slits, and each of which has a stopper portion which forms part of said stopper, each of said stopper portions project outwardly from said cylindrical wall and abuts against said second lower surface of said optical disk so as to limit the axial movement of said center core in said first axial direction through said center hole of said optical disk, and said first and second arched wall portions being alternately arranged, further including a cartridge for enclosing said optical disk, said cartridge having a window for exposing a recording surface of said optical disk, a shutter for opening and closing said window, a center hole for exposing said center core which is attached in said center hole of said optical disk, a mouth into which said optical disk equipped with said center core is inserted into, and extracted from said cartridge, and a lid for opening and closing said mouth, wherein said circular bottom portion of said center core has a center hole, and a first surface facing in said first axial direction toward said first end of said cylindrical wall, and a second surface facing in said first axial direction, said center core further including a circular magnetic member fixed in a circular recess formed in said second surface of said circular bottom portion, and said magnetic member has an annular projection which has a circular hole and which projects in said first axial direction into said center hole of said circular bottom portion, and further including a device having a disk table which is received in said center hole of said cartridge so as to rotatably support said optical disk in said cartridge, and which comprises a magnet for attracting said magnetic member of said center core; and a spindle motor with an output shaft which is inserted through said center hole of said magnetic member.

2. An optical disk system according to claim 1 wherein each of said first arched wall portions has a first circumferential length, and each of said second arched wall portions has a second circumeferential length which is greater than said first circumferential length.

3. An optical disk system according to claim 2 wherein each of said stopper portions comprises an outside cylindrical ledge surface which is substantially a portion of a cylindrical surface of an imaginary right circular cylinder, and each of said claws comprises an outside conical surface which is substantially a portion of a conical surface of an imaginary right circular cone.

* * * * *